United States Patent [19]

DeLise

[11] Patent Number: 5,032,715
[45] Date of Patent: Jul. 16, 1991

[54] APPARATUS AND METHOD FOR COUNTING CONTAINERIZED ITEMS

[76] Inventor: Stephen DeLise, 5 Captains Walk, Bay Shore, N.Y. 11706

[21] Appl. No.: 520,520

[22] Filed: May 8, 1990

[51] Int. Cl.$^5$ .............................................. G01V 9/04
[52] U.S. Cl. ............................ 250/222.2; 250/227.26; 377/6; 377/53
[58] Field of Search ........................ 250/222.2, 227.26; 377/53, 6

[56] References Cited

U.S. PATENT DOCUMENTS

| | | | |
|---|---|---|---|
| 4,151,402 | 4/1979 | Fernandez et al. | 377/6 |
| 4,912,317 | 3/1990 | Mohan et al. | 250/222.2 |
| 4,982,412 | 1/1991 | Gross | 377/6 |

Primary Examiner—David C. Nelms
Assistant Examiner—T. Davenport
Attorney, Agent, or Firm—Stanley Ira Laughlin

[57] ABSTRACT

The invention relates to apparatus for accurately counting the number of containerized items by movement of a unitary emitting and sensor of a beam of light over rows and columns of the planar surface platform supporting the containerized items.

1 Claim, 2 Drawing Sheets

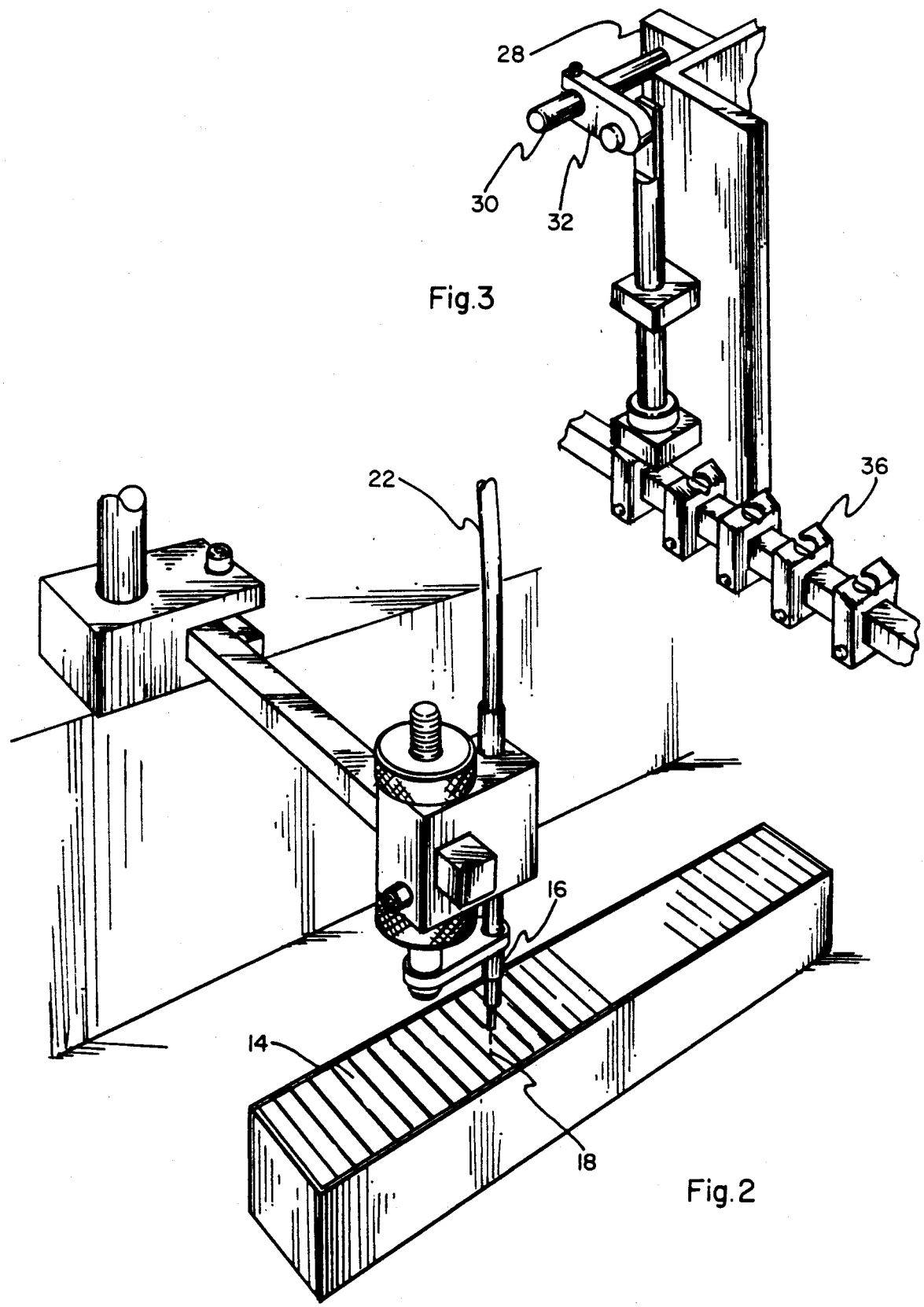

APPARATUS AND METHOD FOR COUNTING CONTAINERIZED ITEMS

BACKGROUND OF THE INVENTION

The invention relates to apparatus for counting the number of packaged items, and more particularly to apparatus for accurately counting the number of small items in the package or container.

DESCRIPTION OF THE PRIOR ART

Conventional apparatus for counting the number of items interrupting a beam of light emitted from one location and sensed at another location are well known.

SUMMARY OF THE INVENTION

The invention relates to an assembly of light beam circuit techniques employing emitting and sensing elements located within one unitary device that can be moved in all directions over various planar locations.

It is an object of the invention to provide highly accurate counting means of items already packaged in open top containers.

It is a further object of the invention to provide economical counting means that are highly reliable.

BRIEF DESCRIPTION OF THE DRAWINGS

FIG. 2 is a detailed drawing of one part of the invention shown in FIG. 1.

FIG. 3 is a detailed drawing of another part of the invention shown in FIG. 1.

DETAILED DESCRIPTION

Figure 1:
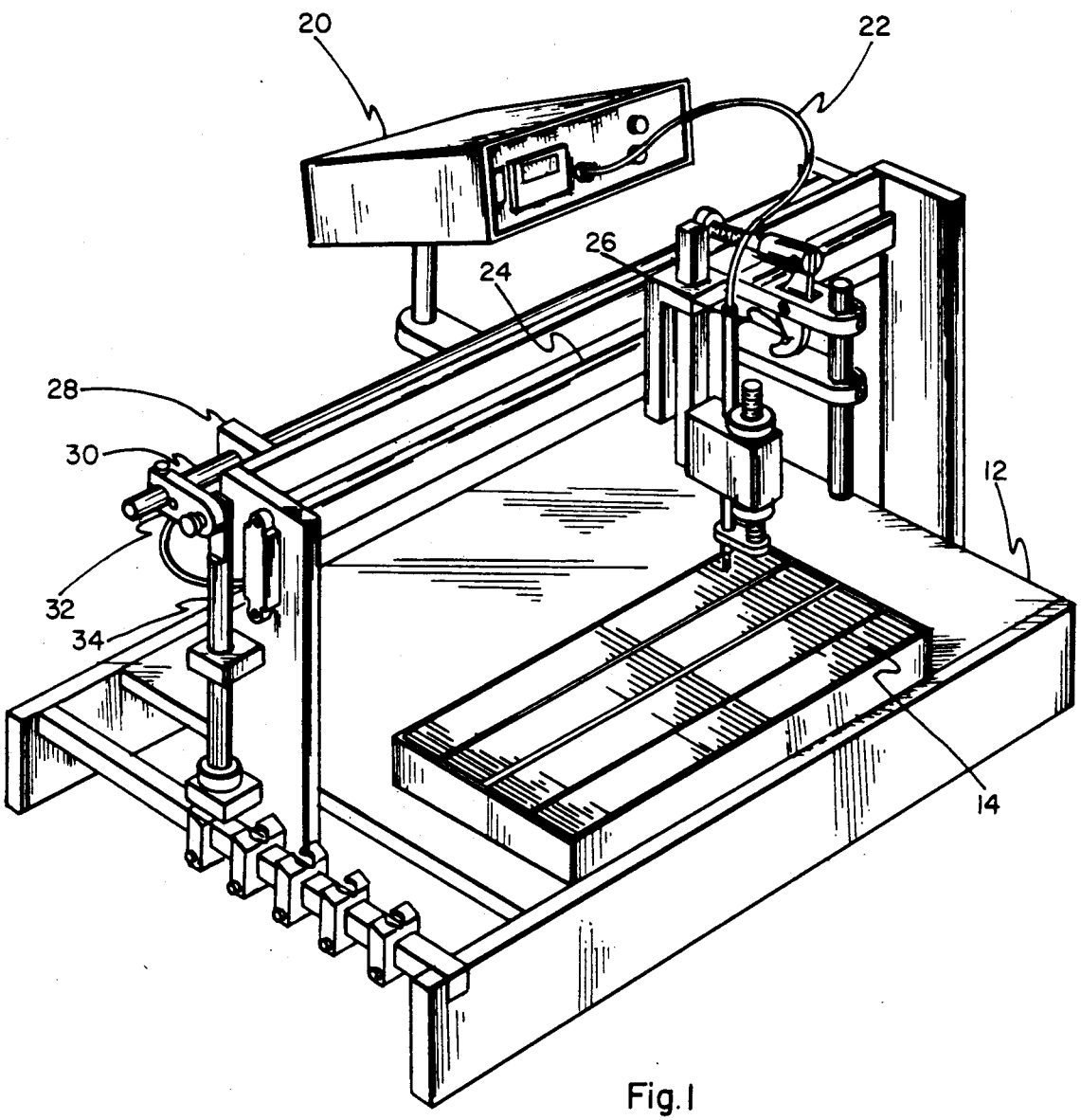
FIG. 1 is an isometric drawing of Applicant's invention.

FIG. 1 shows Applicant's invention employing a platform 12, upon which are positioned in rows a number of containers containing items 14, such as miniature instructional booklets, for counting, comparing and reading out at another location. The items are to be accurately counted as required by recent governmental guidelines. A bridge structure is moveably connected to the platform and is capable of movement from the rear of the platform to the front by means of the mechanism shown in FIG. 3, which will be subsequently explained in the following paragraph. A groove 24 upon the bridge structure provides mechanical means for moving an mating assembly of the light beam and sensor 16 from one side of the platform to the other by pulling handle 26 either way. This allows the beam of light 18 to be reflected back by the item 14 to be immediately sensed by the sensor as it is moved over the container from one side to the other side of the platform 12. Details of the unitary assembly of the light emitting and sensor are shown in detail in FIG. 2.

Referring to FIG. 3, When the light emitting and sensor assembly 16 is brought to either end of the platform, they impact upon bars 28, which mechanically rotates rod 30, lifting lever 32 and rod 34 connected thereto, resulting in the lifting of rod 34 out of positioning notches and permitting forward or rearward movement of the bridge structure, and therefore forward or rearward movement of the light emitting and sensor assembly.

The operator of the apparatus has only to move the light emitting and sensor assembly 18 over the containerized items 14 and check the numbers shown on counter 20 attached to the bridge structure to precisely determine the number of items in the containers on the platforms.

It is expected that the scope and breadth of Applicant's invention will be limited only by the breadth and scope of the annexed claims:

I claim:

1. Apparatus for counting rows of containerized items comprising a platform, a bridge structure moveably connected to said platform for movement over said platform, a unitary light emitting and sensor assembly for orthogonal movement of said unitary assembly relative to said bridge structure, said light emitting and sensor assembly providing means a beam of light to each and every item, which beam of light is reflected back for detection by said sensor, counting means connected to said bridge structure, means for transmitting said light through fiber optics cable to said counter, said counting means producing voltage signals from said reflected light, and comparator means for producing signals to light emitting diode that read out the number of items in each container passed over by said light emitting and sensor assembly.

* * * * *